United States Patent Office 3,351,442
Patented Nov. 7, 1967

3,351,442
TREATMENT OF ALUMINUM FOIL AND
PRODUCT PRODUCED THEREBY
William K. Hooper, Brookfield, Conn., assignor to
Republic Foil, Inc., Danbury, Conn., a corporation of
Delaware
No Drawing. Filed Oct. 21, 1966, Ser. No. 592,962
7 Claims. (Cl. 29—183.5)

ABSTRACT OF THE DISCLOSURE

Aluminum foil electrodes having increased capacity for use in electrolytic capacitors are provided by cold working aluminum foil to reduce its original thickness by between 50% to 99% followed by etching and then by annealing and anodic formation.

---

This is a continuation-in-part of copending applications Ser. No. 423,308, filed Jan. 4, 1965, and Ser. No. 463,055, filed June 10, 1965, now abandoned.

The present invention relates to aluminum foil of increased capacity for use in electrolytic capacitors and to a method of making the same.

In the preparation of aluminum foil for use in electrolytic capacitors the electrical industry is constantly attempting to increase the efficiency of capacitors so as to obtain higher capacitance without a simultaneous increase in the size of the capacitor.

Up to the present, it is customary to roll the aluminum foil into very thin sheets whereby the foil becomes cold worked and its strength is essentially increased. In operating methods used up to the present, the foils were then subjected to an annealing step in order to remove the effect of the cold worked surface. This step was considered essential before the etching of the aluminum took place, which is customary for the purpose of providing an increased surface with attendant increase in capacitance of such aluminum foils. The etching may be either performed by chemical or electrochemical methods. Both these methods cause a considerable increase in the surface area of the aluminum which later undergoes oxidation by anodic formation.

It has now been discovered that a superior product can be obtained when the aluminum foil, after rolling, is directly subjected to an etching process without being first annealed. Thus, for the first time, it is possible not only to simplify the process of making etched aluminum foils for use in capacitors, but to obtain even better results by omitting the annealing step after rolling, thereby accomplishing large savings in time, labor and energy, and rendering the process especially economical.

While the aluminum foil etched directly after cold working exhibits particularly high capacitance when used in electrolytic capacitors, the foil loses ductility and cannot be shaped. Annealing is, therefore, necessary prior to use in capacitors of small size comprising cylindrically shaped coil electrodes.

It is the object of the present invention to provide aluminum foil to be used as an electrode in electrolytic capacitors, which is capable of acquiring an increased capacitance, superior to the best electrodes now available, by up to about 20–50%.

Other objects and advantages of the invention will become apparent from the following detailed description.

As a rule, aluminum foil to be used as an electrode in electrolytic capacitors is used in thicknesses ranging from .0006 to .006 inch, the preferred range for cathode foil being from 0.0006 to 0.002 inch and the preferred range for anode foil being from 0.0025 to 0.004 inch. In solid state technology the preferred thickness is 1/16 of an inch.

In carrying out the invention on aluminum foil of suitable thickness to yield gauge needed after reduction is treated by reducing its thickness by rolling into very thin sheets of 50 to 99% reduction of the original thickness thus obtaining a preferred orientation rolling texture. This texture consists essentially of (110) planes coincident with the rolling plane and <112> direction coincident with the long dimension of the sheet. The aluminum foil is subsequently subjected to a degreasing treatment to remove all traces of rolling oil. Thereafter, the foil is subjected to electrochemical etching preferably in a sodium chloride electrolyte with the electrolyte concentration varying in the range of 5% to 30% sodium chloride, current density in the range of 0.7 to 10 amps per square inch, and coulomb input from 470 to 940. The etched foil is rinsed with de-ionized water, annealed by heating to temperatures between 450° C. and 550° C. and is then passed on to a bath in which anodic formation takes place at a voltage depending on the specific application.

In a particularly advantageous embodiment, the etched foil is rinsed with de-ionized water and is fed into high temperature ovens to effect air oxidation; in the ovens, a temperature as stated above ranging from 450° C. to 550° C. is maintained. The foil is advanced through the oven chamber at a speed which will allow it to remain in the zone of elevated temperature for a mean time of 2–10 minutes before being passed onto anodic formation. Annealing takes place in this case automatically during the oxidation step.

The following block diagram illustrates the sequence of operations:

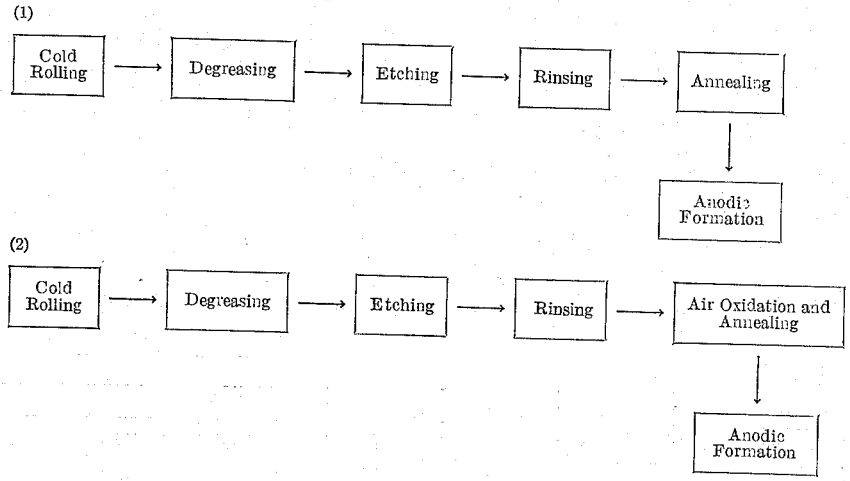

In the following, a number of examples are given for illustrating a method according to the invention. The examples are partly arranged in tabulated form.

The samples of aluminum foil were treated as described above. One series of tests was carried out with formation of the foils in an electrolyte at 6 volts, another at 25 volts, yet another series at 75 volts, and a fourth with a formation at 165 volts. In some test specimens, reduction of thickness had been carried to different values.

The last three columns show comparative results as to capacitance increase between differently treated foils. Column A contains values for conventionally processed hardened and annealed material; column B contains values for foil treated as illustrated in block diagram 1, and column C contains values for foil treated as illustrated in block diagram 2.

These alloys were likewise tested for increase in capacitance. In the following the values found for Alloy 1188 are given by way of example:

| Alloy | Reduction of Thickness, Percent | Volts | Coulomb | Current Density | Capacitance in mf. |
|---|---|---|---|---|---|
| 1188 | 96 | 25 | 470 | 6 | 78.0 |
| 1188 | 96 | 75 | 470 | 6 | 22.5 |

These figures were obtained when operations were carried out according to block diagram 2. As compared therewith, conventional working showed values by about 20 to 40% lower.

The foregoing disclosure relates only to preferred em-

TABLE.—ILLUSTRATING CAPACITANCE

| Foil Material | Reduction of Thickness, Percent | Volts | Coulomb | Current Density | Capacitance in mf. | | |
|---|---|---|---|---|---|---|---|
| | | | | | A | B | C |
| Hardened Al 99.99%: | | | | | | | |
| Pure | 96 | 6 | 705 | 9.36 | 155 | 220 | 280 |
| Do | 96 | 6 | 470 | 9.36 | 145 | 165 | 205 |
| Do | 96 | 75 | 470 | 9.36 | 15.5 | 36 | 42 |
| Do | 96 | 75 | 705 | 9.36 | 16.5 | 25 | 32 |
| | 96 | | 705 | 9.36 | 18.0 | 26 | 31 |
| | 96 | | 705 | 9.36 | 17.0 | 26 | 33 |
| | 96 | | 470 | 9.36 | 17.8 | 23.5 | 30 |
| | | | | 9.36 | 14.5 | 21.7 | 29.6 |
| | | | | 9.36 | 14.0 | 24.0 | 29.9 |
| Do | 96 | 165 | 470 | 9.36 | 4.7 | 5.90 | 7.5 |
| | | | | 9.36 | 4.5 | 5.80 | 7.6 |
| | | | 705 | 9.36 | 4.6 | 8.1 | 11.5 |
| | | | 705 | 9.36 | 5.2 | 8.3 | 10.7 |
| | | | | 9.36 | 5.1 | 8.0 | 11.2 |
| Do | 80 | 25 | 470 | 9.36 | 14.0 | 22 | 30 |
| Do | 60 | 25 | 470 | 9.36 | 13.5 | 17 | 22 |

Both columns B and C show considerable increase of capacitance in capacitors using the aluminum foil prepared according to the invention, C, of course, showing best results. The best gains are obtained in the low and intermediate voltage ranges, that is, 25 to 165 volts, with aluminum foils reduced in thickness to about 96%. However, reduction to between 50 and 60% will also make possible gains in capacitance to about 20%.

The gains obtained are a consequence of the increase of anodic sites for initiation of corrosive attack in the material. These anodic sites are brought about by increase of dislocation densities introduced in the material in the cold worked process.

As stated before, a current density in the range of 0.7 to 10 amps per square inch, may be applied, best results being accomplished at densities between 9 and 10.

The ultimate tensile strength of the foil increases from about 6000–7000 p.s.i. for the annealed to about 15,000–22,000 p.s.i. for the cold worked aluminum foil proposed by the process of this invention.

While the invention has been described with reference to an aluminum foil, it should be understood that aluminum-base alloys containing in excess of 95% by weight of Al and known to be useful as electrode material in electrolytic capacitors may likewise be subjected to the treatment according to the invention with the beneficial results described for aluminum proper. Such alloys are known in the capacitor trade, and they may contain e.g. Zn, Mg, Si, Mn, Cu, Fe and others. The following table gives some typical compositions for such alloys:

bodiments of the invention which is intended to include all changes and modifications of the examples described within the scope of the invention as set forth in the appended claims.

What I claim is:
1. A method for improving the capacitance of foils for use as an electrode in an electrolytic capacitor comprising cold working a metal foil selected from the group consisting of aluminum and aluminum-base alloys containing in excess of 95% by weight of aluminum to reduce its original thickness by between about 50% to about 99% to a thickness between 0.0006 to 0.006 inch and subjecting the cold-worked foil to etching with subsequent annealing and anodic formation.

2. The method according to claim 1, wherein original thickness is reduced by between about 85% to about 96%.

3. A foil suitable for use as an electrode in an electrolytic capacitor comprising a metal foil selected from the group consisting of aluminum and aluminum-based alloys containing in excess of 95% by weight of aluminum, said metal foil having been subjected to cold working, etching, annealing and anodic formation in sequence and having a thickness reduced by 50 to 99% from an original thickness to 0.0006 to 0.006 inch, a tensile strength of 15,000 to 22,000 p.s.i., and an increased capacitance of between 20 and 50% as compared to conventionally processed capacitor foils.

4. A foil according to claim 3 wherein said reduction is by 85 to 96% and said increased capacitance is between 40 and 50%.

| Alloy | Copper | Magnesium | Silicon | Iron | Manganese | Titanium | Zinc | Al |
|---|---|---|---|---|---|---|---|---|
| 1199 | .0043 | .0008 | .0014 | .0019 | | | | Balance. |
| 1193 | .0035 | .0047 | .0154 | .0320 | .0018 | .004 | .0062 | Balance. |
| 1188 | .003 | .001 | .039 | .053 | .002 | | | Balance. |
| 1145 | .007 | .003 | .08 | .23 | | | .03 | Balance. |

5. The method according to claim 2, wherein the foil is subjected to a degreasing treatment after the rolling step.

6. The method according to claim 1, wherein after working in cold state and etching the foil is subjected to high temperature air oxidation and anodic formation.

7. The method according to claim 1, wherein said foil after cold working to a thickness reduced by about 50% to about 99% of the original thickness, is subsequently degreased to remove all traces of lubricating oil, then subjected to electrochemical etching in a sodium chloride electrolyte with a concentration varying from about 5% to 25% sodium chloride, current density in the range of 0.7 to 10 amps per square inch, and coulomb input from 470 to 940, rinsed, subjected to high temperature air oxidation accompanied by annealing, and then subjected to anodic formation.

References Cited

UNITED STATES PATENTS

| | | | |
|---|---|---|---|
| 2,930,741 | 3/1960 | Burger et al. | 204—141 |
| 3,193,485 | 7/1965 | Vincent | 204—141 |

DAVID L. RECK, *Primary Examiner.*

RICHARD O. DEAN, *Examiner.*